United States Patent [19]

Saunders et al.

[11] 4,161,049
[45] Jul. 17, 1979

[54] PASSENGER LOADING BRIDGE

[75] Inventors: Robert L. Saunders, Ogden; George D. Hone, Roy, both of Utah

[73] Assignee: Abex Corporation, New York, N.Y.

[21] Appl. No.: 912,692

[22] Filed: Jun. 5, 1978

Related U.S. Application Data

[63] Continuation of Ser. No. 847,638, Nov. 1, 1977, abandoned.

[51] Int. Cl.² .................................................. E01D 1/00
[52] U.S. Cl. ....................................................... 14/71.5
[58] Field of Search ........................ 14/71.5, 71.1, 71.3

[56] References Cited

U.S. PATENT DOCUMENTS

| Re. 26,859 | 4/1970 | Riggles | 14/71.5 |
|---|---|---|---|
| 2,581,293 | 1/1952 | Read | 14/71.5 |
| 2,875,457 | 3/1959 | Read | 14/71.5 |
| 3,378,868 | 4/1968 | Wollard | 14/71.5 |
| 3,462,785 | 8/1969 | Seipos | 14/71.5 |
| 3,462,787 | 8/1969 | Seipos | 14/71.5 |
| 3,538,528 | 11/1970 | Porter | 14/71.5 |
| 3,561,030 | 2/1971 | Seipos | 14/71.5 |
| 3,793,662 | 2/1974 | Gacs | 14/71.5 |

Primary Examiner—Nile C. Byers, Jr.
Attorney, Agent, or Firm—David A. Greenlee; Thomas S. Baker, Jr.

[57] ABSTRACT

A passenger loading bridge includes a ground level rotunda, a tunnel support vertically pivoted thereto, an elevated tunnel horizontally pivoted to the support, a drive assembly horizontally pivoted to the tunnel outer end and rigidly mounting a detachable aircraft engaging cab. Stairs are located in the tunnel support. The drive assembly swings and elevates the tunnel, while a parallelogram linkage assures that the cab is level at all elevations. The cab is offset 45° to the tunnel axis and has extension and rotation capabilities. The tunnel features a load bearing floor support and walls and a roof of curtain wall construction.

21 Claims, 24 Drawing Figures

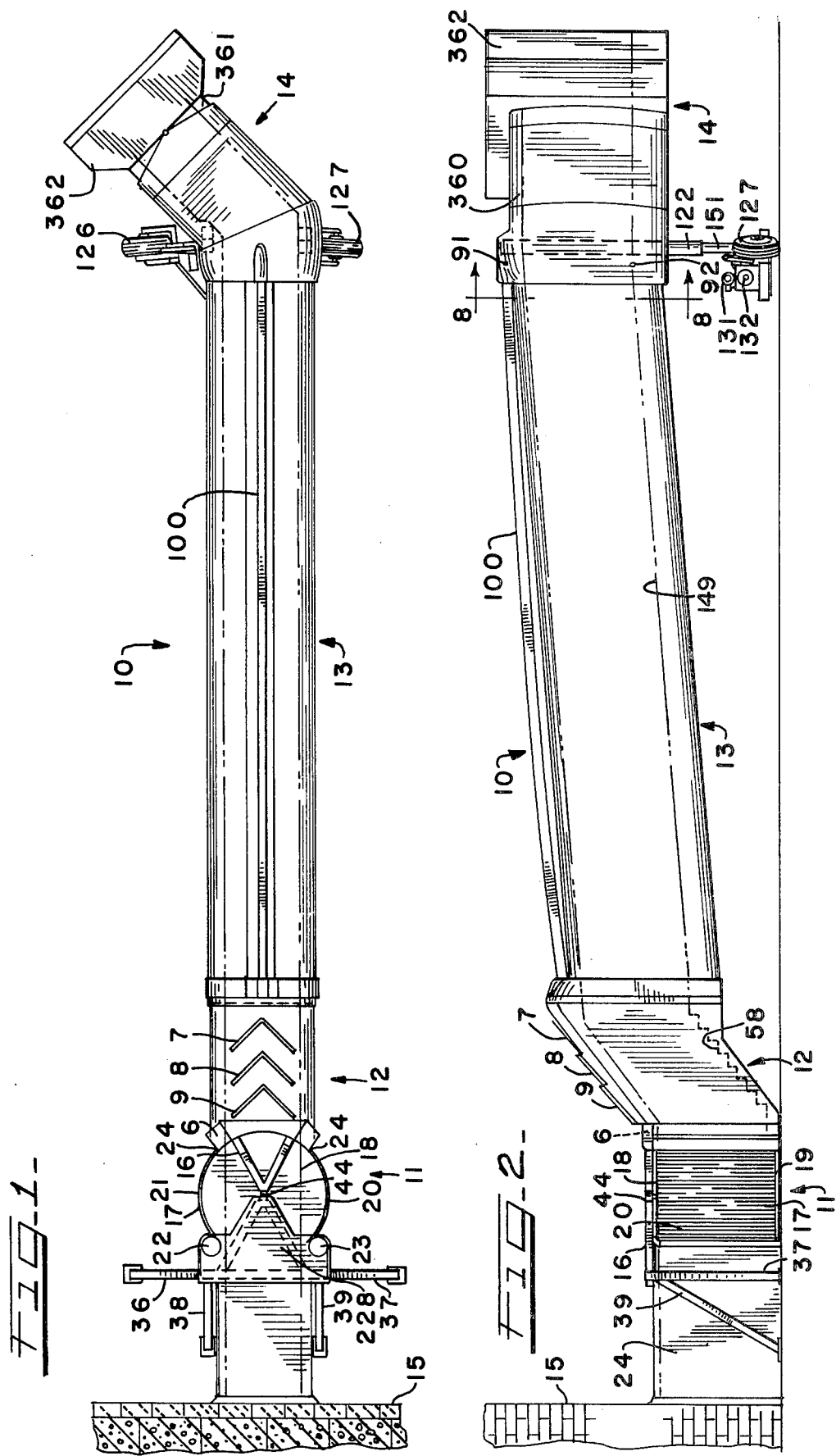

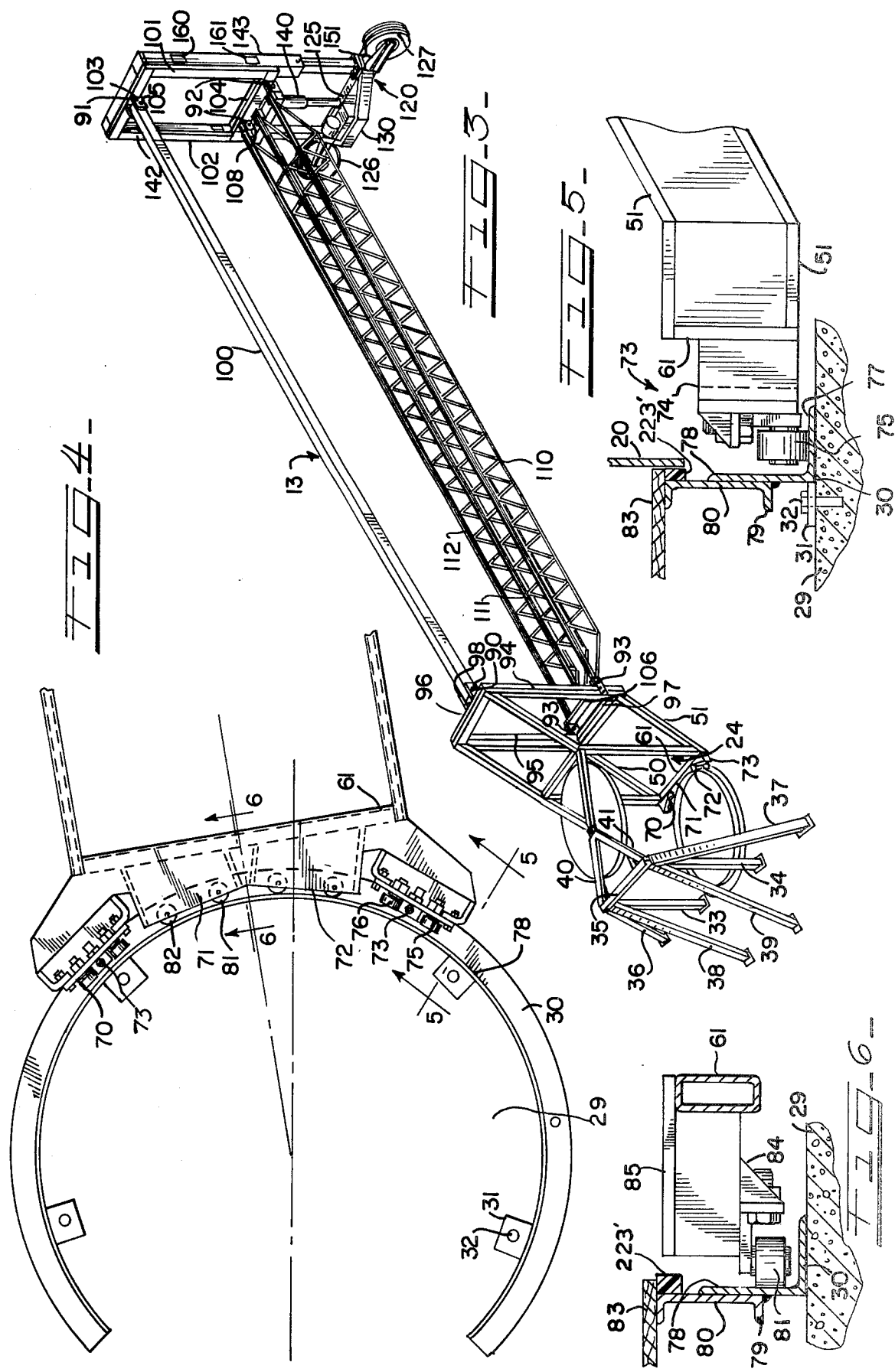

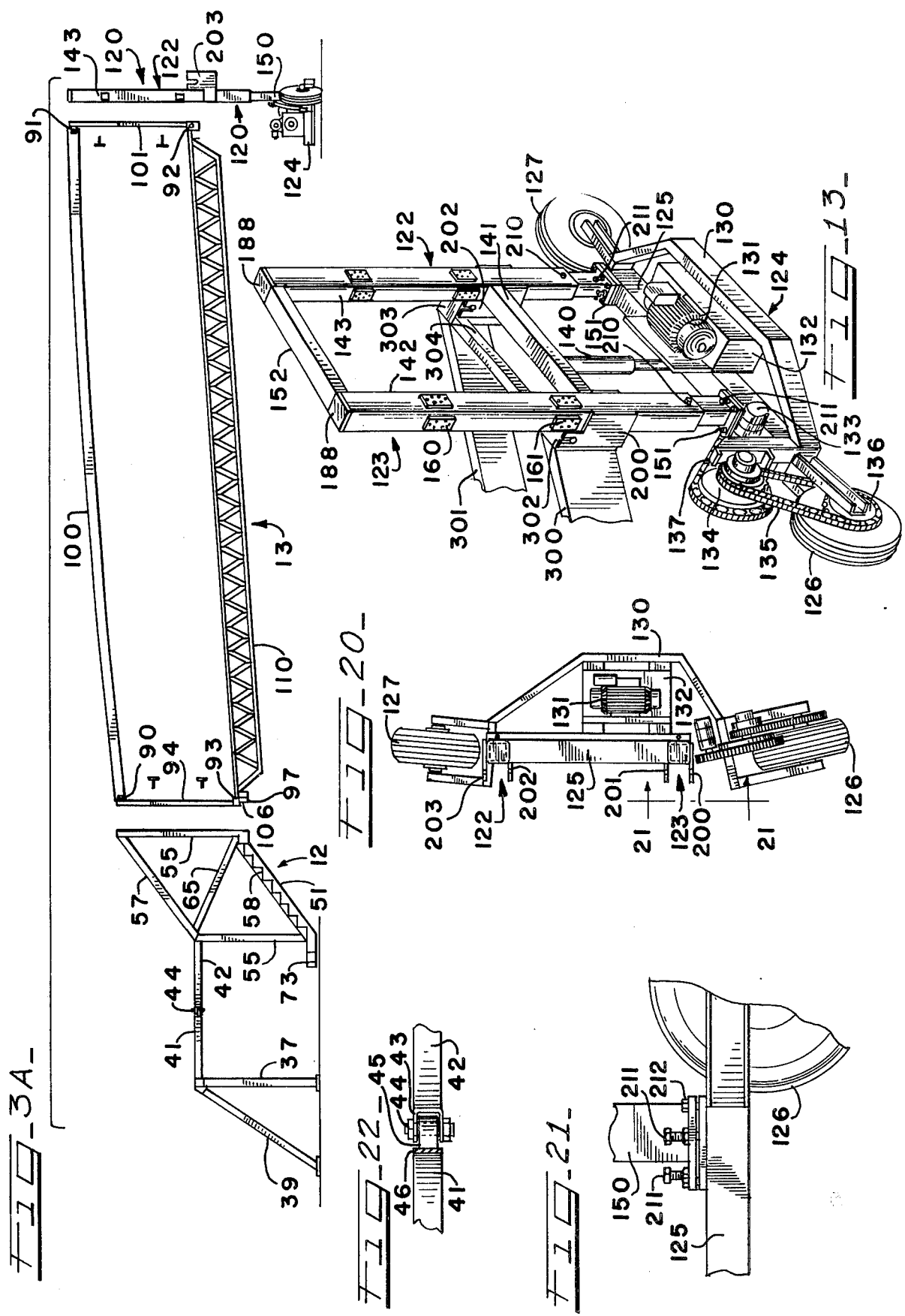

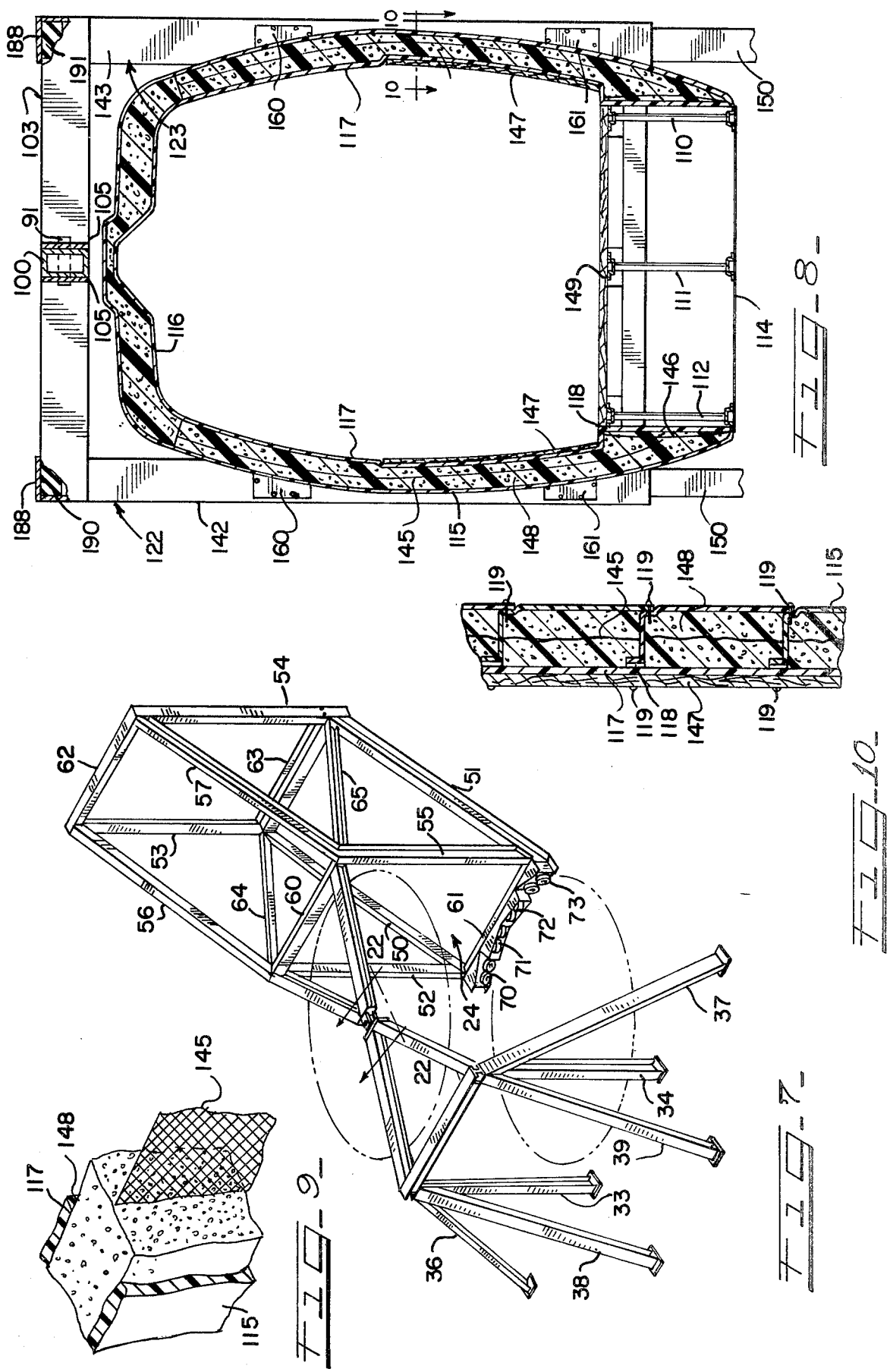

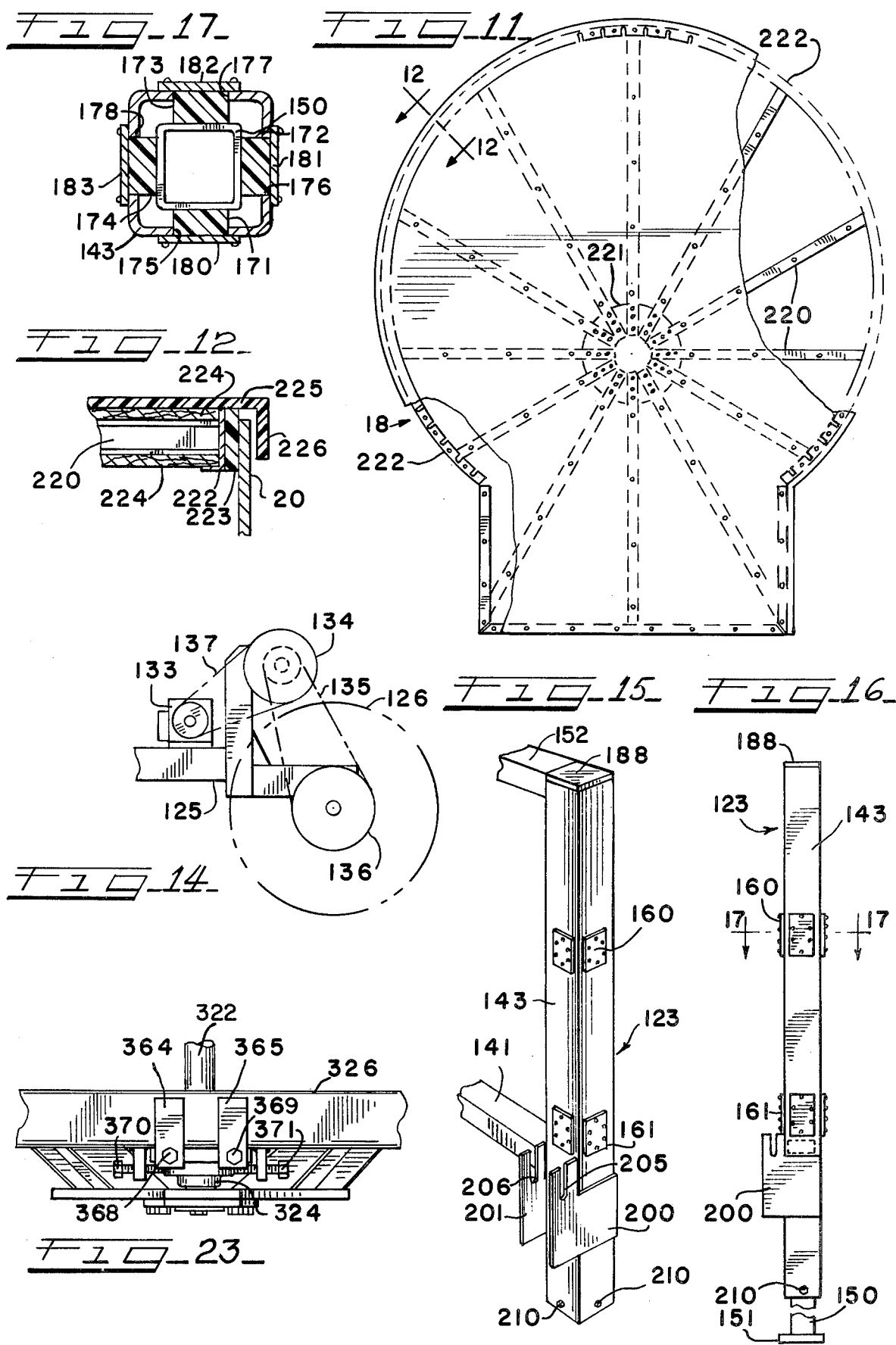

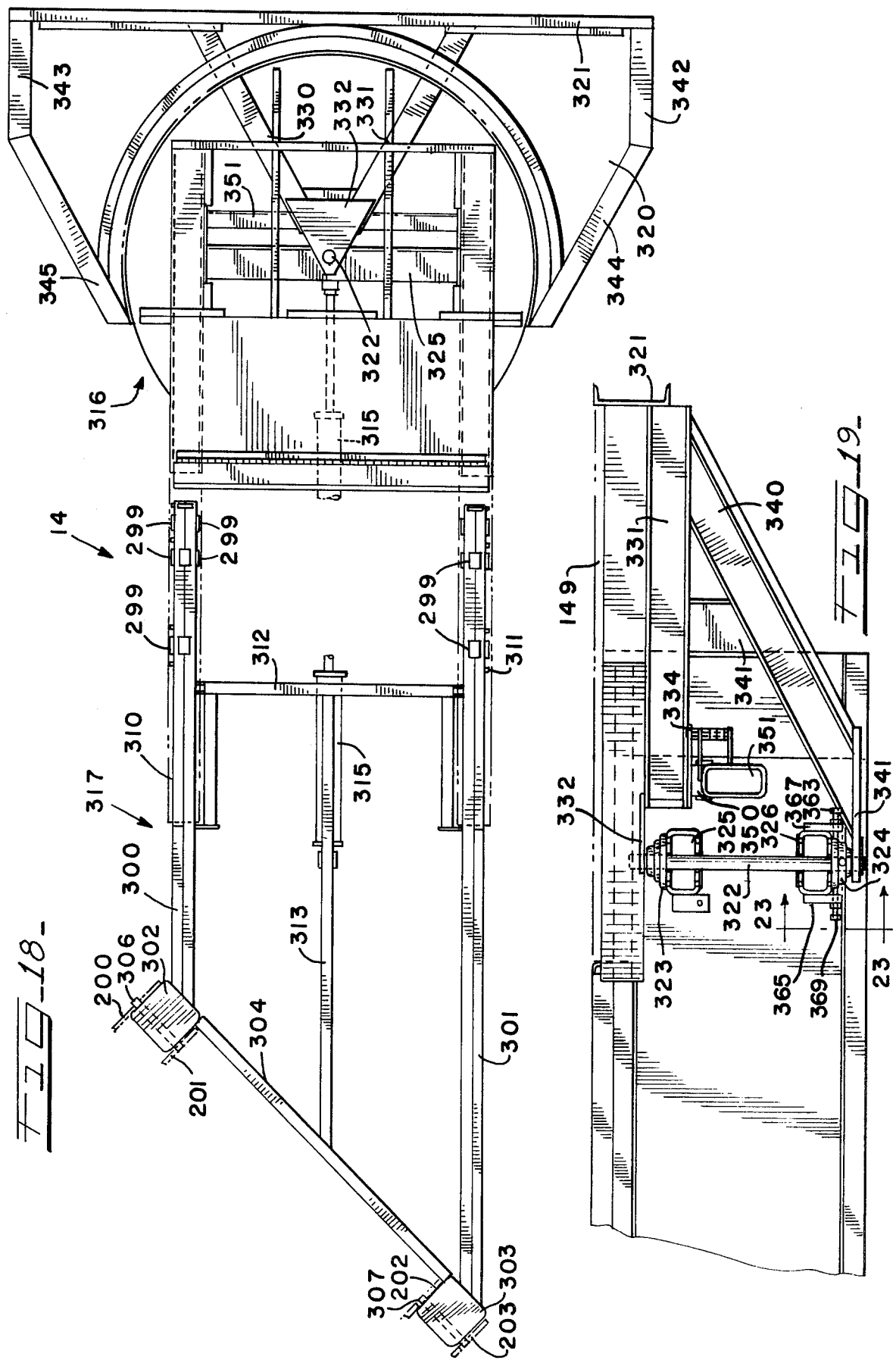

PASSENGER LOADING BRIDGE

BACKGROUND OF THE INVENTION

This is a continuation of application Ser. No. 847,638, filed Nov. 1, 1977 and now abandoned.

This invention relates generally to passenger loading bridges and, in particular, to a swinging-type passenger loading bridge for use at ground level airport terminals.

Passenger loading bridges have gained worldwide acceptance for the safety and convenience they afford passengers. Most major air terminals are provided with passenger loading bridges which extend from the second level of the terminal to a parked aircraft. Frequently, these bridges are relatively immobile since aircraft can park close to the terminal and be moved away by tugs or tractors.

Smaller air terminals generally are only ground level structures at which aircraft park a fixed distance from the terminal building. There frequently are no tugs available. This fixed distance is required to enable the aircraft to "power out" or move away from the building under its own power without damaging the building with jet blast. This distance is greatest with a Boeing 727-200 aircraft, which is the largest aircraft normally serving these smaller terminals. Passengers walk in the open out to the aircraft and up an open staircase into the airplane. It is not desirable to subject passengers to inclement weather or to potentially dangerous ramp conditions. It is therefore desirable to provide a passenger loading bridge for use at these smaller air terminals to enhance the safety and comfort of passengers.

A prior art swinging-type of ground level loading bridge is shown in U.S. Pat. No. 3,110,048—Bolton, which illustrates a bridge having a rotunda, tunnel, stairs to aircraft level, and a second tunnel which extends to the aircraft. The juncture of the stairs and the tunnel is provided with an arcuate track with cooperating wheels to support the load of the bridge. The wheels are provided with means to elevate the entire tunnel and stairs to accommodate different aircraft. This bridge design has never been commercialized, nor has any other ground level bridge, to our knowledge.

SUMMARY OF THE INVENTION

The present invention provides a passenger loading bridge for ground level use at smaller airport terminals. The swing-type passenger loading bridge of the present invention is provided with a rotunda section adjacent the terminal, a tunnel, a drive assembly for swinging and elevating the tunnel, and a tunnel support including stairs pivotally joining the inner end of the tunnel to the rotunda. Each of these sections is essentially modular and may be built and assembled at the factory. It is easily disassembled and each modular section transported independently for quick assembly at the airport site.

The outer or ramp end support for the tunnel section includes a novel arrangement of telescoping box beams or columns supported on ramp engaging wheels. While prior art types of columns were carefully machined, the telescoping beams of this invention need not be machined and polished, but merely sanded because of the use of bearing pads. The columns also provide support for the cab section, which is angled 45° relative to the tunnel axis and is extensible and rotatable to facilitate proper aircraft engagement. The cab section has a "quick connect" mounting means which permits it to be shipped as a modular unit and quickly attached to the drive assembly. The drive assembly is connected to the tunnel support by a parallelogram linkage including an upper beam and the floor support to assure constant verticality of the drive columns in all elevations. This assures that the cab will always be parallel with the ground. All of the normal (live and dead) load stresses for the bridge are borne by the tunnel floor support, thereby eliminating the need for load bearing walls and roof utilized in prior art passenger loading bridges. The walls and roof are of light-weight, non-structural, curtain wall construction which need bear only normal roof (ice, snow) and wind load stresses. The walls are of reinforced plastic construction, such as fiberglass or the like, and molded to a shape to provide maximum width at an elevation of the normal person's lower torso. This permits the tunnel floor to be reduced in width, which reduces the tunnel live and dead weight design loads. This enables a lighter weight bridge structure as compared to prior art bridges.

Consistent with fire regulations and to further serve passenger comfort, the walls of this passenger loading bridge are capable of withstanding fire for at least a period of five minutes to allow passengers to exit. A fire retardant plastic, having a central open mesh support, is placed between the inner and outer wall panels.

The stair section is located in the tunnel support and only swings horizontally. This reduces the length of span in the tunnel section that needs to be elevated. The load forces are taken from the tunnel section through the tunnel support into the rotunda section, where they are taken up in the foundation.

Other objects and features of this invention will become apparent on reference to the accompanying drawings.

DESCRIPTION OF THE DRAWINGS

FIG. 1 is a plan view of the swing-type passenger loading bridge of the present invention;

FIG. 2 is a side view of the passenger loading bridge of FIG. 1;

FIG. 3 is a perspective view of the structural framework of the bridge, with the cab framework omitted;

FIG. 3A is a side view of the framework of FIG. 3 with the tunnel framework detached, illustrating the modular sections;

FIG. 4 is an enlarged plan view of the rotunda interface with the tunnel support, illustrating the location of the rollers which transmit the vertical and horizontal loads from the tunnel support to the rotunda anchor ring;

FIG. 5 is an enlarged fragmentary cross-sectional view taken along the line 5—5 of FIG. 4, illustrating the vertical rollers;

FIG. 6 is an enlarged fragmentary cross-sectional view taken along the line 6—6 of FIG. 4, illustrating the horizontal support rollers;

FIG. 7 is an enlarged perspective view of the framework of the rotunda and stair tunnel support;

FIG. 8 is an enlarged cross-sectional view taken along the line 8—8 of FIG. 2, showing the tunnel construction;

FIG. 9 is an enlarged fragmentary perspective view of a tunnel wall;

FIG. 10 is an enlarged cross-sectional view taken along the line 10—10 of FIG. 8;

FIG. 11 is an enlarged plan view of the rotunda roof, partially broken away to show construction details;

FIG. 12 is a fragmentary enlarged cross-sectional view taken generally along the line 12—12 of FIG. 11, illustrating the track guide and seal arrangement;

FIG. 13 is an enlarged perspective view of the drive column, illustrating the quick disconnect cabmounting means;

FIG. 14 is an enlarged schematic view of the wheel drive arrangement shown in FIG. 13;

FIG. 15 is a perspective view of one of the support columns;

FIG. 16 is a side view of the support column shown in FIG. 15;

FIG. 17 is an enlarged cross-sectional view taken generally along the line 17—17 of FIG. 16, illustrating the guide pad arrangement for the telescoping columns;

FIG. 18 is an enlarged plan view of the cab support framework;

FIG. 19 is an enlarged partial side view of the cab support framework shown in FIG. 18;

FIG. 20 is a plan view of the drive assembly;

FIG. 21 is a detail view of a portion of the drive assembly denoted by 21—21 of FIG. 20;

FIG. 22 is a fragmentary view of the pivotal connection of the tunnel support to the rotunda; and FIG. 23 is a detail view of a portion of the cab support framework denoted by lines 23—23 of FIG. 19.

DETAILED DESCRIPTION OF THE INVENTION

Referring now to FIGS. 1 and 2, a passenger loading bridge 10 includes a rotunda section 11, a tunnel support 12, a ramp or tunnel section 13, and a cab assembly section 14. The rotunda 11 is located in engagement with an opening (not shown) of an airport terminal building 15. The rotunda 11 includes a framework 16 and an enclosure 17.

The enclosure 17 has a roof section 18, floor section 19, and movable curtains 20 and 21. The free end of the curtain is joined adjacent the tunnel support entrance at 24 and the curtains coil into and uncoil out of the barrels 22 and 23 as the bridge 10 is swung angularly about the rotunda 11.

From a structural standpoint, all of the horizontal and vertical load forces are transferred from the bridge through tunnel support 12 to rotunda 11. As shown in FIGS. 4, 5 and 6, rotunda 11 is provided with a flanged base or anchor ring 30. Ring 30 is anchored to a concrete ramp pad 29 by ears 31 and anchor bolts 32 spaced around the inner periphery.

The structural framework for rotunda 11 is best seen in FIGS. 3, 3A and 7 and consists of a pair of vertical columns 33 and 34 which support a header 35. Angled braces 36 and 37 provide lateral stability to the columns 33 and 34, respectively, while angled braces 38 and 39 resist forces in the direction of the terminal, as will become more apparent. A pair of braces 40 and 41 extend from the intersections of columns 33 and 34 and header 35 to a plate 46 which, as seen in FIG. 22, mounts a tongue 45 which receives a king pin 44.

The tunnel support framework is also shown in FIGS. 3 and 3A, consisting of lower stair stringers 50 and 51 which mount upright columns 52 and 53 and 54 and 55. The stringers 50 and 51 support a staircase 58, which enables passengers to walk from the ground level rotunda 11 to the elevated tunnel 13.

The upper ends of the columns 52 and 53 are joined by a roof stringer 56, with a stringer 57 joining the upper ends of the columns 54 and 55. A pair of transverse braces 60 and 61 join the upper and lower ends of the columns 52 and 55, with similar braces 62 and 63 joining the upper and lower ends of the columns 53 and 54. Diagonal braces 64 and 65 rigidify the entire structure.

As best seen in FIGS. 3-7, the lower transverse brace 61 mounts thrust roller assemblies 70, 71, 72 and 73. The roller assemblies 70 and 73 transfer bridge vertical load forces from the tunnel support to lower flange 77 of ring 30 and roller assemblies 71 and 72 transfer horizontal load forces to upstanding flange 78 of ring 30.

As shown in FIGS. 4 and 5, roller assembly 73 is mounted on a roller bracket assembly 66 that is mounted by brackets 74 and 67 which are mounted on brace 61. Bracket 74 supports a pair of rollers 75 and 76, which bear against and roll on flange 77. Roller assembly 70 is of like design.

Flange 78 absorbs the horizontal forces applied by the roller assemblies. As shown in FIG. 6, a channel-shaped member 80 is welded to the backside of flange 78. The upper part of the channel 80 supports a plywood deck 83 which may be covered with a suitable floor covering, such as carpet or the like. Roller assembly 71 comprises rollers 81 and 82 which are mounted on a roller bracket assembly 84, which is mounted through mounting bracket 85 to brace 61. The roller assembly 72 is of like design.

As seen in FIGS. 1 and 2, the tunnel support framework and staircase are covered by a suitable material, such as reinforced plastic. The roof has a plurality of deflectors 7, 8 and 9 to direct rain water to the sides.

Referring now to FIGS. 3 and 3A, the framework of tunnel 13 is constructed in a generally parallelogram shape, with the corners of the parallelogram provided at pivots 90, 91, 92 and 93. The inner link of the parallelogram is formed by the vertical braces 94 and 95 and transverse braces 96 and 97. Brace 96 supports brackets 98 which pivotally engage the inner end of a beam 100 via a pivot pin 90. Beam 100 forms the upper parallelogram link. The outer parallelogram link is a similar rectangular frame composed of the vertical members 101 and 102, joined at the top by transverse member 103 and at the bottom by member 104. The transverse member 103 mounts a pair of brackets 105, which are joined by pivot pin 91 to the outer end of beam 100. As seen in FIG. 2, beam 100 has an upward camber so that compression will deflect the beam upwardly rather than downwardly against the ramp enclosure.

The lower parallelogram link is the tunnel floor support formed by three identical open web trusses or beams 110, 111 and 112 which are welded at their inner ends to a transverse brace 106 that is pivoted to tunnel support transverse bracket 97 by aligned pivot pins. A similar arrangement is provided on the outer ends of the trusses 110, 111 and 112 which are welded to a brace 108 that is pivoted to the outer frame by aligned pivot pins 92.

While open web trusses are illustrated, it is obvious that any suitable type of load bearing member is equally acceptable, the open web beams being chosen for their good strength-to-weight ratio. If operating conditions are such that beam 100 is never in compression, but always in tension, it could be replaced by a cable or other flexible member. It is also contemplated that the parallelogram link represented by beam 100 could be spaced below trusses 110, 111, 112 just as long as a parallelogram linkage is utilized.

A drive assembly 120, shown in FIG. 13, is provided for swinging and elevating the outer end of tunnel 13. Drive assembly 120 includes telescoping column assemblies 122 and 123 which are identical in construction. The telescoping assemblies 122 and 123 each have the lower ends bolted to a bogey assembly 124, which includes a main frame 125 having wheel mounts at each end for mounting wheels 126 and 127.

As observed in FIGS. 1, 2 and 3A, wheels 126 and 127 are angled relative to the axis of the main frame 125 so that the wheel axes intersect king pin 44 to keep the wheels tangent to the swing arc of the bridge. Wheels 126 and 127 are located well outboard of column assemblies 122 and 123 to provide a wide base to minimize torsional forces transmitted to the tunnel resulting from movement of the bridge, windloads, jet blast or the like. This is important with respect to the present bridge since the structural framework is designed mainly for horizontal and vertical load forces, with little or no resistance to torsional forces in tunnel 13. Obviously, torsional forces at the inner end of the tunnel can be absorbed in the tunnel support. Any torsional forces at the outer end of the tunnel are absorbed by drive assembly 120 through the telescoping column assemblies 122 and 123.

Welded to opposite ends of the main bogey frame 125 is a bracket 130, which supports a hydraulic pump 131 and reservoir 132. Hydraulic lines (not shown) connect pump 131 to a drive motor 133 which is supported on main frame 125 outwardly of column assembly 122. Hydraulic drive motor 133 drives drive wheel 126 through a chain 137, an idler reducer 134, and a sprocket 136, shown schematically in FIG. 14. While a hydraulic motor and pump arrangement is shown, it is obvious that other forms of drive motors may be utilized.

It should be noted that the support frame for the pump and drive motor is located on the inner side of the bridge and substantially below the lower extremity to which the bridge may be lowered. This eliminates any possibility of damage to the drive through accidental contact with ramp vehicles. In the past, the drive units of bridges have become damaged where the drive unit is suspended beneath the bridge. Through the present arrangement, the drive unit is at all times protected.

The drive column assembly 120 also includes an elevating hydraulic, or other type, ram 140 having its upper cylinder end connected to a transverse beam 141 and its lower end mounted on beam 125. The ram 140 is supplied by pump 131 and controlled by conventional controls (not shown) to raise and lower the tunnel outer end.

Referring now to FIGS. 21 and 15-17, the telescoping column assemblies 122 and 123 are joined at their upper end by a transverse brace 152. A previously noted, both assemblies 122 and 123 are identical. Assembly 123 includes the outer telescoping box beam 143, which receives an inner smaller telescoping box beam 150 having a mounting plate 151 at its lower end. As seen in FIGS. 3 and 13, the mounting plate 151 is bolted to the frame 125 of the drive assembly 120, making field assembly quite convenient.

Identical upper and lower bearing pad assemblies 160 and 161 are mounted on all four sides of outer beam 143. As shown in FIG. 17, bearing pad assemblies 160 include rectangular bearing pads 171, 172, 173 and 174 made of nylon, polypropylene or the like, which extend through rectangular openings 175, 176, 177 and 178 in beam 143 and engage the outer surfaces of beam 150. Cover plates 180, 181, 182 and 183 which mount the pads, are secured by bolts to beam 143.

As seen in FIGS. 8, 15 and 16, the upper end of the outer beams are closed by caps 188 with resilient blocks 190 and 191 disposed immediately beneath it. Blocks 190 and 191 engage the upper end of the inner beams when the bridge is fully lowered to support the entire bridge load.

As shown in FIGS. 13, 15 and 16, each of the column assemblies 122 and 123 is provided with respective pairs of mounting plates 200 and 201 and 202 and 203. The plates have U-shaped slots 205 and 206 in their outer ends.

As shown in FIGS. 13 and 21, alignment bolts 211 are provided at the base on at least two sides of each inner beam. Bolts 211 are adjusted into position and locked by lock nuts at the factory to assure that the column assemblies are parallel and vertical.

Referring to FIGS. 11 and 12, the roof of the rotunda is made of a weld-free construction. A plurality of steel channels 220 are riveted to a center ring 221 and extend outwardly where they are connected through plywood panels 224 to an outer ring 222. A peripheral plastic strip 223 is provided as a bearing for curtains 20 and 21 as they move around the rotunda. The framework of steel channels 220 is covered by plywood or other suitable covering 224. The outer covering 224 is covered with reinforced plastic 225 (FIG. 12), having a peripheral flange 226 which forms a weather seal. Sufficient clearance is provided so that curtains 20 and 21 can freely move in the space between the flange 226 and bearing strip 223. As can be observed in FIGS. 1 and 2, the rotunda roof is mounted beneath the structural framework and is covered with a shroud or hood 228.

As noted above, the major load forces on the bridge are carried by tunnel support trusses 110, 111 and 112, with any tensile or compressive forces above the deck being absorbed by the beam 100. This structural arrangement permits the exterior walls of the ramp to be of a non-load bearing nature, as distinguished from the load bearing walls which are commonplace in present commerical forms of bridges.

With particular reference to FIG. 8, it can be observed that the load bearing trusses 110, 111 and 112 carry a decking 149 of plywood which may be covered with decorative carpeting or any suitable floor covering. The underside of the trusses 110, 111 and 112 is closed off by sheet metal plates 114 for appearance as well as to provide additional fire retardation at the lower extremity of the bridge. The void formed between the trusses 110, 111 and 112 can be used for electrical and other utility service out to the plane.

The tunnel walls are of segmented curtain wall construction and include outer panels 115 formed of a reinforced plastic or other light-weight material. Wall inner panels 117 extend from the lower edge of trusses 110, and 112 upward and join to a roof panel 116 of like material. The tunnel walls are formed of a plurality of identical segments, as shown in FIG. 10, with flanges 118 which attach to the lower ends of trusses 110 and 112 to provide rigidity in the panel. Each segment has a recess which receives the overlapping or free end of the adjacent panel to form a smooth outer skin. Expansible blind fasteners 119 are used to join the plastic panels together at the overlap.

During assembly of the walls, an open mesh support, or a wire grid 145, is interposed intermediate the inner and outer wall panels. A second wire grid 146 is attached to the outer side of the trusses 110 and 112 at the lower extremity of the tunnel, where greater fire resistance is needed. The wire grid 145 extends along and is slightly spaced from the outer part of the trusses 110 and 112. The upper wire grid 145 overlaps the lower wire grid 146.

The lower half of the inner walls of the tunnel are formed of plywood 147, which is sufficiently flexible to conform to the shape of the flanges 118 and yet sufficiently rigid to provide good structural support. The upper half of the inner walls may be covered with molded, rigid, fire-resistant plastics sold under the trademarks Lexan, Formica or the like. Openings are left in the upper panels to permit the injection of an insulating and fire retardant foaming composition between the walls where it will foam and fill the space to insulate the bridge, as well as improving its fire resistance. The foam 148 which is injected is preferably urea-formaldehyde. The grid reinforced foam becomes self-supporting in the absence of the inner or outer wall panels.

Referring now to FIGS. 13, 18 and 19, the cab assembly includes structural framework all located beneath floor or deck 149.

The structural framework for cab assembly 14, FIG. 18, includes an inner section, indicated generally at 317, having a pair of spaced support box beams 300 and 301 which are joined to mounting blocks 302 and 303 at a 45° angle so that the cab is angled 45° relative to the tunnel. A brace or spacer 304 has its ends joined to the mounting blocks. The mounting blocks are provided with transverse mounting pins 306, 307 at their upper ends which are received in U-shaped slots 205 and 206 in the drive assembly mounting plates 200 and 201 and 202 and 203.

As shown in FIG. 13, the lower ends of mounting blocks 302 and 303 extend down along and abut the outer surfaces of box beams 143 and 142, respectively, to support the cab support beams 300 and 301 in a horizontal plane or at right angles to vertical beams 143 and 142. The outer ends of beams 300 and 301 are connected by a cross brace 312, which is connected at its mid-point to the transverse brace 304 by a longitudinally extending stiffener brace 313.

Telescoped over the box beams 300 and 301 are outer beams 310 and 311 which support the movable portion 316 of the cab assembly. For ease of description, the telescoping outer beams 310 and 311 are shown in phantom lines in the retracted position. The outer or movable end 316 of the cab assembly is shown in solid lines, removed from the beams 300 and 301 for ease of illustration. A hydraulic cylinder 315 is located beneath the beam 313 to extend and retract outer end 316 of the cab assembly at a 45° angle relative to the tunnel axis. Each of the box beams 300 and 301 mounts a plurality of bearing pads 299 on its upper side and lower surfaces, which may be formed of Oilon, plastic or the like. The pads 299 permit outer beams 310 and 311 to telescope or slide over the inner beams 300 and 301 in response to actuation of the cylinder 315. The outer end 316 of cab assembly 14 also includes a rotatable outer deck section 320. Deck section 320 includes a transverse beam 321 which is supported for angular movement relative to a center pivot shaft 322, which, as best seen in FIG. 19, is a shaft supported by upper and lower trunnions 323 and 324. The trunnions 323 and 324 are mounted on cross braces 325 and 326 which extend between the outer telescoping beams 310 and 311. A pair of angularly movable support members 330 and 331 are joined together at the inner ends by a top gusset plate 332, which is carried by the trunnion 323. On the underside of the beams 330 and 331 is a similar gusset plate 334, which serves to reinforce the juncture of members 330 and 331. The outer ends of members 330 and 331 are joined by the transverse beam 321, which may receive a rubber bumper (not shown) and is adapted to engage the side of the aircraft immediately below the door. Each of the angularly movable members 330 and 331 is braced by an angled beam (only one shown in FIG. 19) 340, joined through gusset plate 341 to the lower trunnion 324. A vertical brace 341′ extends between angled beam 340 and upper beam 331 to provide a rigid assembly, cantilevered off of the trunnions and angularly movable between defined limits.

Transverse beam 321 at the outer end of the cab is provided with side beams 342 and 343 which are joined to angular beams 344 and 345, respectively. These beams mount the walls of the cab assembly and carry the load of the passengers. Load forces are passed back to the drive column assemblies 122 and 123 through beams 310 and 311 and beams 300 and 301. The deck section 320 is angularly movable through a 30° arc about the shaft 322 by any conventional hydraulic or other means (not shown). Thus, slight misalignment between the aircraft and the outer end of the passenger loading bridge may be accommodated.

In operation, an aircraft will taxi to a premarked spot on the ramp and the passenger loading bridge is swung outwardly and the cab assembly then extended and rotated to align with the aircraft door opening. This provides a tolerance of several feet in which to accommodate slight misalignments in parking the aircraft.

Vertical loads of the angularly movable outer deck section 320 are carried by a bearing pad 350 (FIG. 19), which is mounted on top of transverse beam 351 in engagement with the underside of the gusset plate 334 to carry the vertical loads which are applied to the angularly movable part of the cab section. Any horizontal loads are taken by the spaced trunnions 323 and 324.

Referring now to FIGS. 19 and 23, lower trunnion 324 is mounted to facilitate adjustment longitudinally along the axis of the beam 326 and transversely in order to align outer deck section 320 with the inner deck of the cab assembly. Bolts 370 and 371 adjust the trunnion along the axis of the beam 326, while bolts 368 and 369 mounted in brackets 364 and 365 adjust the trunnion 324 toward the front of the cab. A similar pair of bolts 368 and 369 is provided in identical brackets 367, to align the swinging outer deck section 320. The normal elevation of the underside of the cab at its lowermost position is such that a person of average height can ordinarily reach the bolts 368–371 and quickly adjust the position of the lower trunnion 324 to align the deck section.

As can be seen in FIGS. 1 and 2, the cab assembly 14 extends at a 45° angle from the axis of the tunnel 13 and is provided with a fixed enclosure 360 which telescopically receives the movable enclosure 361. The enclosure 362 on the angularly movable portion of the cab is attached to the outer end of the telescoping section 361. If desired, the enclosure 362 may be provided with a roll-up door of conventional type. These enclosures may be of the same non-structural, light-weight curtain wall construction as the tunnel walls and roof.

In operation, elevation of the tunnel will cause horizontal movement of the tunnel outer end which must be accommodated. In present bridges of this type, specific compensation means must be provided. For example, in the current Jetway radial drive bridge, arcuate guides are provided in the drive assembly to cause the tunnel outer end to elevate in an arcuate path. In our bridge, however, no specific horizontal movement compensation means need be provided. We have found that by sizing the drive column box beams and bearings to have certain tolerances, which are dependent upon bridge length and elevation range, that this horizontal movement compensation is provided automatically by slight relative angulation of telescoping box beams.

The preferred embodiment of our invention has been shown and described. Certain features, however, are applicable to conventional, second level passenger loading bridges, such as the parallelogram tunnel support for maintaining the cab parallel to the ground; the tunnel walls and roof being of light-weight curtain wall construction enabled by the floor supports bearing the normal live and dead load forces; the use of open web trusses to support the tunnel; the telescoping box beam drive columns; the angled extensible and rotatable cab assembly which has a quick-connect attachment to the drive assembly; the rotunda structure; and other features described herein.

We claim:

1. A passenger loading bridge for interconnecting an aircraft with the ground level of an airport terminal building including:
   a. a rotunda connected to the building substantially at ground level;
   b. a tunnel support vertically pivotally connected at its inner end to the rotunda;
   c. a tunnel having first horizontal pivot means connecting its inner end to the tunnel support outer end;
   d. an aircraft engaging cab assembly connected to the outer end of the tunnel; and
   e. a drive assembly having second horizontal pivot means mounting the outer end of the tunnel and including elevating means for elevating the tunnel and car assembly; characterized by
   f. a staircase located in the tunnel support; and
   g. the first horizontal pivot means connecting the tunnel to the tunnel support being located at the top of the staircase.

2. A passenger loading bridge for interconnecting an aircraft and an airport passenger terminal, including a tunnel section having a floor, side walls and a roof, characterized by
   a. a floor support extending longitudinally of the tunnel and bearing all normal structural loads;
   b. the side walls and roof being of non-structural, curtain wall construction subject only to wind and roof loads.

3. The passenger loading bridge of claim 2, further characterized by the floor support comprising a plurality of longitudinal open web joists.

4. A passenger loading bridge for interconnecting an aircraft with the ground level of an airport terminal building including:
   a. a rotunda connected to the building substantially at ground level;
   b. a tunnel support vertically pivotally connected at its inner end to the rotunda to enable horizontal swinging movement of the tunnel support;
   c. a tunnel horizontally pivotally connected at its inner end to the tunnel support;
   d. an aircraft engaging cab assembly connected to the outer end of the tunnel; and
   e. a drive assembly mounting the outer end of the tunnel for swinging the tunnel about the rotunda and including elevating means for elevating the tunnel and cab assembly; characterized by
   f. the tunnel having a floor support extending longitudinally of the tunnel and bearing all normal structural loads and the side walls and roof being of non-structural curtain wall construction subject only to wind and roof loads.

5. The passenger loading bridge of claim 4, further characterized by the drive assembly including a pair of ground engaging wheels, each spaced beyond the width of the tunnel to reduce torsional loads on the tunnel.

6. In a passenger loading bridge for interconnecting an aircraft and a passenger terminal building, a tunnel section having a floor, spaced side walls and a roof, characterized by the floor width being narrower than the widest spacing of the side walls, thereby reducing the tunnel design load, while maintaining the same ease of passenger movement as a conventional tunnel having a floor width equal to the widest spacing of its side walls.

7. The passenger loading bridge of claim 6, further characterized by the roof width being narrower than the widest spacing of the side walls.

8. The passenger loading bridge of claim 7, further characterized by a floor support extending longitudinally of the tunnel and bearing normal structural loads, the side walls and roof being of non-structural curtain wall construction.

9. The passenger loading bridge of claim 8, further characterized by each side wall comprising spaced inner and outer panels and an insulating and fire retardant plastic foam layer located therebetween.

10. The passenger loading bridge of claim 9, further characterized by an open mesh support located in the foam between the inner and outer panels.

11. The passenger loading bridge of claim 6, further characterized by the walls comprising a plurality of identical outwardly curved panels interconnected along their vertical sides to form the tunnel.

12. A passenger loading bridge for interconnecting an aircraft with an airport passenger terminal building including:
   a. a rotunda connected to the building;
   b. a tunnel pivotally connected at its inner end to the rotunda for horizontal and vertical movement;
   c. a drive assembly mounting the outer end of the tunnel for swinging the outer end horizontally and vertically;
   d. a cab; and
   e. a cab support connecting the cab to the tunnel outer end at an acute angle relative to the tunnel longitudinal axis; characterized by
   f. cab extension means for moving the cab relative to the cab support at said acute angle to enable the cab to move substantially perpendicular to the longitudinal axis of an aircraft when the bridge is in position to engage the aircraft.

13. The passenger loading bridge of claim 12, further characterized by said acute angle being from 25° to 50°.

14. The passenger loading bridge of claim 13, further characterized by said acute angle being about 45°.

15. The passenger loading bridge of claim 12, further characterized by cab rotation means mounting the cab on the end of the cab extension means for limited rotation.

16. The passenger loading bridge of claim 15, further characterized by the limited rotation being through an arc of about 30°.

17. A passenger loading bridge for interconnecting an airplane and an airport terminal building, comprising:
 a. a tunnel;
 b. pivot means connecting the inner end of the tunnel to the building for vertical swinging movement;
 c. a drive assembly including a tunnel support pivoted to the tunnel outer end, lift means for elevating the tunnel outer end, guide means for guiding tunnel elevation, and ground engaging means;
 d. a cab; and
 e. a cab support mounting the cab on the drive assembly; characterized by the guide means comprising
 f. a first pair of horizontally spaced, vertically extending box beams mounted on the ground engaging means;
 g. a second pair of horizontally spaced, vertically extending box beams of different size mounted on the tunnel support, the smaller pair of box beams being telescopically received within the larger pair of box beams; and
 h. a plurality of bearing pads interposed between the inner surfaces of the larger box beams and the outer surfaces of the smaller box beams to guide the elevating movement of the tunnel.

18. The passenger loading bridge of claim 17, further characterized by the drive means including adjustment means engaging the lower ends of the first pair of box beams and the ground engaging means for aligning the beams in a parallel, vertical orientation.

19. The passenger loading bridge of claim 18, further characterized by the beams and bearings being sized to permit relative lateral movement between the inner and outer box beams sufficient to accommodate the relative horizontal movement of the tunnel which occurs during elevation of the tunnel to preclude the need for specific horizontal movement compensating means.

20. A passenger loading bridge for interconnecting an aircraft with an airport terminal building comprising:
 a. a tunnel;
 b. pivot means connecting the inner end of the tunnel to the building for vertical swinging movement; and
 c. a drive assembly for elevating the tunnel outer end pivoted to the tunnel outer end; characterized by
 d. a modular cab assembly including a cab, a cab support and means for pivoting the cab relative to the cab support; and
 e. quick-connect cab mounting means rigidly and removably mounting the cab assembly to the drive assembly for vertical movement therewith.

21. The passenger loading bridge of claim 20, further characterized by the quick-connect cab mounting means including a pin and slot connection between the cab assembly and the drive assembly and engageable abutment portions on the cab and drive assemblies spaced vertically from the pin and slot connections.

* * * * *